United States Patent [19]
Merger et al.

[11] 3,852,335
[45] Dec. 3, 1974

[54] SEPARATION OF BASIC INORGANIC COMPOUNDS FROM THE REACTION MIXTURE OBTAINED IN THE MANUFACTURE OF HYDROXYPIVALIC ACID NEO-PENTYLGLYCOL ESTER (2,2-DIMETHYL-1,3-PROPANEDIOL-HYDROXYPIVALIC MONOESTER

[75] Inventors: Franz Merger, Frankenthal; Gerd Duembgen, Dannstadt, both of Germany

[73] Assignee: BASF Aktiengesellschaft, Ludwigshafen/Rhein, Germany

[22] Filed: July 9, 1973

[21] Appl. No.: 377,613

[52] U.S. Cl. .............................................. 260/484 R
[51] Int. Cl. ............................................ C07c 60/66
[58] Field of Search ................................ 260/484 R

[56] References Cited
UNITED STATES PATENTS
3,057,911  10/1962  Finch .............................. 260/484 R
3,641,117   2/1972  Platz et al. ....................... 260/484 R Primary Examiner—Lorraine A. Weinberger
Assistant Examiner—Paul J. Killos
Attorney, Agent, or Firm—Johnston, Keil, Thompson & Shurtleff

[57] ABSTRACT

Separation of basic inorganic compounds from the reaction mixture obtained in the manufacture of hydroxypivalic acid neopentylglycol ester (2,2-dimethyl-1,3-propanediol-hydroxypivalic monoester) by the addition of formic acid to the mixture obtained from the reaction of hydroxypivalaldehyde in the presence of basic catalysts, followed by filtration. The compound produced in the process of the invention is a valuable intermediate in the manufacture of polyesters, synthetic resins and plasticizers.

3 Claims, No Drawings

SEPARATION OF BASIC INORGANIC COMPOUNDS FROM THE REACTION MIXTURE OBTAINED IN THE MANUFACTURE OF HYDROXYPIVALIC ACID NEO-PENTYLGLYCOL ESTER (2,2-DIMETHYL-1,3-PROPANEDIOL-HYDROXYPIVALIC MONOESTER)

This invention relates to a process for the separation of basic inorganic compounds from the reaction mixture produced in the manufacture of hydroxypivalic acid neopentylglycol ester (2,2-dimethyl-1,3-propanediol-hydroxypivalic monoester) by the addition of formic acid to the mixture obtained in the reaction of hydroxypivalaldehyde in the presence of basic catalysts, followed by filtration.

It is well known that hydroxypivalaldehyde disproportionates in the presence of magnesium iodine ethyl (see Monatshefte fur Chemie, Vol. 25 (1904), pp. 865 et seq.) to form 2,2-dimethyl-1,3-propanediol hydroxypivalic monoester (hydroxypivalic acid neopentylglycol ester). Specific catalysts used in the Tishchenko conversion of aldehydes to esters in anhydrous medium are aluminum alcoholates and sodium alcoholates (Ber. 20 (1887), p. 646). In German Applications DAS 1,643,650 and DOS (Application P    O.Z. 29 279);
(Application P    O.Z. 29 275) and
(Application P    O.Z. 29 285) there are described processes for the manufacture of hydroxypivalic acid neopentylglycol ester in the presence of hydroxides, oxides and hydrated oxides of the metals lithium, magnesium, calcium, strontium, barium, thallium, lead, bismuth, lanthanum, cerium, zinc, cadmium, manganese, iron, cobalt and nickel in anhydrous medium or with the addition of water.

In the processes carried out in anhydrous medium and, still more, in cases where aqueous reaction mixtures are obtained in the reaction or where water is added before an anhydrous reaction mixture is worked up, the catalysts remain mainly undissolved, i.e., usually in an amount of from 30 to 80 percent of the total catalyst used. It is usually very difficult to remove the undissolved portions by filtration and to obtain a clear solution of desired product for further processing. The undissolved catalyst portions are generally finely suspended in the solution and show only a low rate of sedimentation. During filtration, they usually accumulate to form a pasty filter cake of low permeability, the flow of liquid therethrough being progressively hampered as the layer of filter cake grows. The residual filter cake is usually moist and contains considerable amounts of organic material. Difficulties arise in operating the plant, for example the decanter may no longer be used and losses of final product occur and the cost of destroying the filter cake, for example by biological degradation, is high.

It is an object of the present invention to provide a novel process for effecting, in a simpler and more economical manner, improved separation of the basic inorganic compounds used as catalysts in the reaction or forming from the catalysts during the reaction.

We have found that basic inorganic compounds may be advantageously removed from the reaction mixture obtained in the reaction of hydroxypivalaldehyde in the presence of basic catalysts to form hydroxypivalic acid neopentylglycol ester, if formic acid is added to the reaction mixture and the mixture is then filtered.

The conversion (disproportionation) of the hydroxypivalaldehyde may be represented by the following equation:

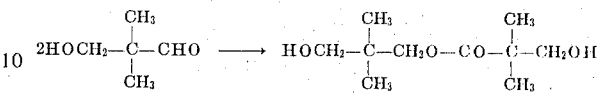

Compared with the prior art, the process of the invention effects better separation of the basic inorganic compounds used as catalysts for the reaction or forming from the catalyst during the reaction, and in a simpler and more economical manner. Good crystallization and sedimentation of the inorganic catalyst components and also substantially complete precipitation of the dissolved inorganic portions are achieved. An unexpected result is the selective effect of formic acid. Acetic acid, propionic acid and n- and iso-butyric acids do not achieve the same results by far. Although sulfuric and phosphoric acids are also suitable as precipitants, the degree of crystallization is far less pronounced than when formic acid is used and the filterability of the mixture is correspondingly poorer. Unlike formic acid, these acids also impair the distillability of the mixture.

The hydroxypivalaldehyde used as starting material may be in pure form or in the form of the crude product of the reaction of isobutyraldehyde with formaldehyde. The reaction mixtures used as starting mixtures for the present process are preferably aqueous mixtures and water may be added to anhydrous reaction media prior to the treatment with formic acid. Conveniently, the reaction mixture contains from 3 to 50 percent and preferably from 5 to 25 percent of water, by weight. The organic portion of the reaction mixture usually contains, apart from e.g. 80–95 percent by weight of product, varying amounts (depending on the procedure used) of impurities frequently comprising from 1 to 10 percent by weight of unreacted hydroxypivalaldehyde, from 0 to 0.6 percent by weight of hydroxypivalic neopentylglycol ester monoformate, from 0 to 4 percent by weight of 2-(hydroxy-t-butyl)-5,5-dimethyldioxane-1,3 (i.e., the acetal of neopentylglycol), from 0.5 to 4 percent by weight of neopentylglycol mono-isobutyrate, from 0.5 to 5 percent by weight of neopentylglycol and from 0 to 3 percent by weight of hydroxypivalic acid, based on the organic portion of the total mixture. In such mixtures the metal of the inorganic catalyst is usually partly dissolved and partly undissolved, e.g., as the hydroxide. In general, the starting mixtures contain from 0.5 to 20 percent and conveniently from 1 to 10 percent by weight of metal, based on the product. This amount is calculated on the basis of the total metal in the catalyst irrespective of the constitution and composition of the basic inorganic compounds present in the reaction mixture. Calculations based on the catalyst do not take into account any carrier materials which may be used, such as silicates or silica gel.

In general, from 0.5 to 5 percent and preferably from 1 to 2 percent by weight of formic acid (calculated as 100 percent pure) are used, based on the total reaction mixture. Advantageously, treatment with formic acid is carried out at a temperature of at least 50°C and preferably at from 75° to 95°C, at atmospheric or elevated pressure, continuously or batchwise.

The process may be carried out as follows. The reaction according to one of the above processes is carried out by disproportionation of hydroxypivalaldehyde. The resulting reaction mixture is then conveniently adjusted to the above treatment temperature and, if desired, water is added to the mixture, after which formic acid is added at the treatment temperature over from 1 to 10 minutes, whereupon the treatment is continued for a further 5 to 10 minutes with thorough mixing. The solid is then removed by filtration or decantation and the product is separated in known manner, for example by fractional distillation.

The compound produced in the process of the invention is a valuable starting material for the manufacture of polyesters, synthetic resins and plasticizers. For information on its use, see the publication cited above.

In the following Examples the parts are by weight unless otherwise stated, the parts by weight relating to the parts by volume as do kilograms to liters.

EXAMPLE 1 a. (Comparative Test) A solution of 510 parts of hydroxypivalaldehyde and 90 parts of water is treated with 10 parts of pulverized calcium hydroxide and reacted for 20 minutes with stirring at from 60° to 100°C. The mixture is filtered at from 90° to 95°C using a pendulum-type centrifuge having a filtering surface area of 1.2 m$^2$ and rotating at a speed of 800 r.p.m. Although the filtering rate is initially from 10 to 15 l/min, it falls rapidly after about one third of the total amount has been filtered and is eventually so slow that the total filtering time amounts to 5 hours. The residue consists of 6.4 parts of a pasty mass containing 40 percent by weight of hydroxypivalic acid neopentylglycol ester, which can be mechanically removed from the filter only with difficulty and in any case incompletely. The filtrate contains 65 percent by weight of the original calcium in dissolved form. The solid cannot be separated using a decanter.

b. A reaction mixture of the same composition as that used in Example 1a is taken and 6 parts of formic acid (calculated as 100 percent pure) are added with stirring at 90°C before filtration is commenced. The crystallizing solid settles within 5 minutes after stirring has been stopped, and the supernatent solution is clear. The total mixture is filtered over 20 minutes using the same centrifuge, no appreciable reduction in filtering rate being observed throughout this period. There is obtained a well crystallized filter cake having a residual moisture content of 8 percent by weight and capable of being easily and completely removed from the filter by mechanical means. It is completely soluble in water. The filtrate contains 15 percent by weight of the original calcium.

c. The reaction and treatment as described in Example 1b is repeated except that further 6 parts of formic acid are used. The results are the same except that only 5 percent by weight of the original calcium remains in solution.

EXAMPLES 2 TO 8

2,040 parts of hydroxypivalaldehyde and 360 parts of water are reacted for 1 hour with stirring at 90°C in the presence of catalyst. The following Table lists the nature and amount of catlyst in each case. 2,000 parts by volume of the catalyst suspension at 85°C are filtered through a filter No. 583 by Schleicher und Schuell in a fritted glass disk heated with steam at 80°–90°C, the filtering time $t_1$ being that obtained with no treatment with formic acid, whilst the filtering time $t_2$ is that obtained when 20 parts of 100 percent w/w formic acid are added prior to filtration. The amount of catalyst cation ($Me_1$ or $Me_2$) remaining in solution is given in the Table in percent by weight, based on the initial total amount of catalyst metal.

TABLE

| Example | Parts | Catalyst | $t_1$ (min) | % w/w $Me_1$ | $t_2$ (min) | % w/w $Me_2$ |
|---------|-------|----------|-------------|--------------|-------------|--------------|
| 2 | 25 | MgO | 50 | 56 | 3 | 12 |
| 3 | 75 | Sr(OH)$_2$ | 40 | 53 | 2.5 | 16 |
| 4 | 105 | Ba(OH)$_2$ | 30 | 43 | 2.5 | 11.5 |
| 5 | 135 | PbO | 35 | 36 | 2.5 | 13 |
| 6 | 50 | ZnO | 39 | 49 | 2.5 | 15 |
| 7 | 80 | CdO | 31 | 42 | 2.5 | 11 |
| 8 | 60 | Mn(OH)$_2$ | 32 | 41 | 2.5 | 15 |

We claim:

1. A process for separating basic inorganic compounds from the reaction mixture obtained in the conversion of hydroxypivalaldehyde to hydroxypivalic acid neopentylglycol ester in the presence of basic catalysts, wherein formic acid is added to the reaction mixture, which is then filtered.

2. A process as claimed in claim 1, wherein said separation is carried out using from 1 to 2 percent by weight of formic acid (calculated as 100 percent pure), based on the total reaction mixture.

3. A process as claimed in claim 1, wherein said separation is carried out at a temperature of from 75° to 95°C.

* * * * *

UNITED STATES PATENT AND TRADEMARK OFFICE
CERTIFICATE OF CORRECTION

PATENT NO. : 3,852,335
DATED : December 3, 1974
INVENTOR(S) : Franz Merger and Gerd Duembgen It is certified that error appears in the above–identified patent and that said Letters Patent are hereby corrected as shown below:

In the heading, insert --[30] Foreign Application Priority Data, July 13, 1972, Germany, P 22 34 358.4--.

Signed and Sealed this second Day of December 1975

[SEAL]

Attest:

RUTH C. MASON
*Attesting Officer*

C. MARSHALL DANN
*Commissioner of Patents and Trademarks*